May 18, 1943. H. J. MAIHACK 2,319,422
FOOD WARMER
Filed Aug. 3, 1940
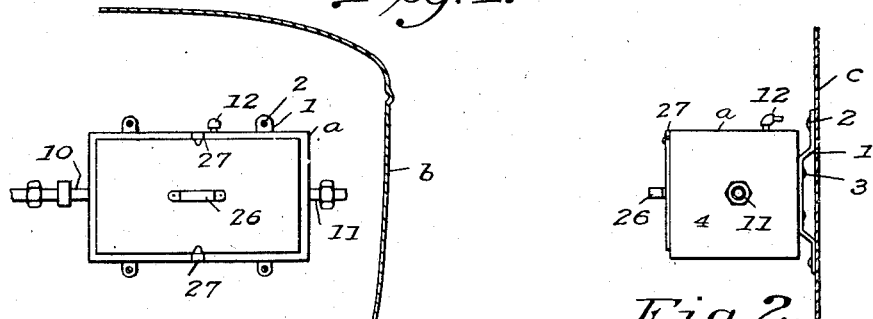
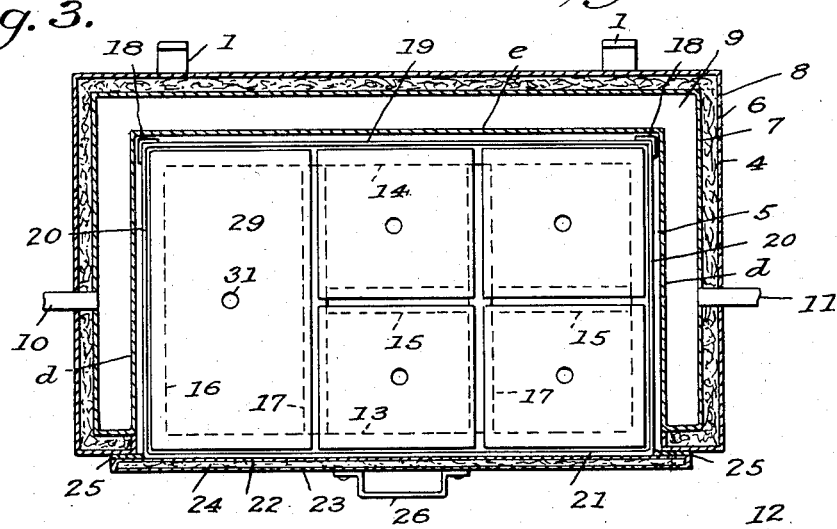
Inventor
HERMAN J. MAIHACK
By Milans & Milans
Attorneys Patented May 18, 1943

2,319,422

UNITED STATES PATENT OFFICE 2,319,422

FOOD WARMER

Herman J. Malhack, Jersey City, N. J., assignor of one-half to George H. Hutaff, Jr., Wilmington, N. C.

Application August 3, 1940, Serial No. 350,918

1 Claim. (Cl. 126—20)

My invention relates to new and useful improvements in food warmer or oven and has for its principal object the provision of a device of the character described which may be attached under the dashboard of an automobile or to the body at any other suitable point and in which the water of the cooling system of the automobile is used as the heating medium.

Another object of the invention resides in the provision of a warmer or oven of the character described in which there is a casing or housing formed with a heating chamber and a slidable drawer normally positioned therein, the drawer being of a formation to receive a plurality of removable containers in which the food is placed, the containers being accessible when the drawer is removed or pulled from the heating chamber.

A further object of the invention consists in the provision of a novel form of drawer formed and adapted for holding the individual removable containers, the containers including removable covers each of which is provided with a vent opening for the escape of steam, the covers being spaced from the wall of the heating chamber to permit escape of steam from the chamber through a suitable vent provided for this purpose.

Still another object of the invention resides in the provision of an oven or warmer of the character described in which there is a casing or housing provided with insulated walls, a compartment being formed in the casing or housing for the reception of a slidable drawer and the drawer including a front face portion suitably insulated, this front face portion or wall of the drawer forming a closure for the compartment formed within the casing or housing.

With the above and other objects in view, which will appear as the description proceeds, my invention consists in the novel details of construction and arrangement of parts, described in the following specification and illustrated in the accompanying drawing, and while I have illustrated and described the preferred embodiments of the invention, as they now appear to me, it will be understood that such changes may be made as will fall within the scope of the appended claim.

In the drawing:

Fig. 1 is a front elevation of the warmer or oven with parts of the automobile body shown in section.

Fig. 2 is an end elevation of the warmer or oven with the supporting part of the automobile body shown in section.

Fig. 3 is a horizontal section through the warmer or oven with the covers or tops of the individual containers shown in top plan.

Fig. 4 is a longitudinal vertical section through the warmer or oven with parts shown in elevation; and Fig. 5 is a transverse vertical section through the warmer or oven with parts shown in elevation.

In the drawing $a$ denotes generally my improved form of warmer or oven, $b$ denotes a portion of the automobile body and $c$ denotes a supporting wall for the warmer or oven, this supporting wall being a part of the automobile body preferably positioned beneath or adjacent the dashboard thereof.

The warmer or oven $a$ is supported from the wall $c$ by the brackets 1, these brackets being secured to the wall $c$ by screws, rivets or other suitable fastenings 2 and to the warmer or oven by the screws, rivets or other suitable fastenings 3.

The warmer or oven $a$ includes an outer casing or housing 4 and inner compartment 5, the outer casing or housing including the outer wall 6 and inner wall 7 between which is placed suitable insulating material shown generally at 8. The inner compartment 5 includes the end walls, $d$, back wall $e$, top $f$, and bottom $g$, the front of the compartment being normally open through the casing or housing 4 to receive a slidable drawer to be later described. The chamber 9 is formed between the outer casing or housing 4 and inner compartment 5 to receive water from the cooling system for the automobile engine, an inlet being disclosed at 10 and an outlet at 11, the inlet and outlet being connected to the desired points of the cooling system as will be found most convenient. It will be understood that the water of the cooling system becomes hot as the automobile is driven and therefore hot water will be received in the chamber 9 through the inlet 10 and then discharged through the outlet 11, the water during its circulation through the chamber heating the containers carried by the drawer, to be later described, and keeping the food therein warm. At 12 I have shown a steam outlet from the compartment 5.

As previously stated a drawer is provided and normally slides into the compartment 5, from the front thereof, and is supported by the bottom wall $g$ of the compartment. This drawer is formed of what may be termed a skeleton framework including a bottom portion formed of front and rear longitudinally extending angle bars 13 and 14, intermediate longitudinally extending inverted T-shaped angle bar 15, transversely extending end angle bars 16, and intermediate transversely extending inverted T-angle bars 17. Extending upwardly from the rear longitudinally extending angle bar 14 are the corner angles shown at 18 and secured to these upwardly extending corner angles, at their upper ends, is a longitudinally extending bar 19 having the forward extensions 20 connected by the bar 21, which is parallel with the bar 19. The bar 21, as well as the bottom longitudinally extending angle bar 13, are secured to the inner face 22 of the front wall of the drawer, as shown quite clearly in Figs. 3 and 5 of the drawing, the outer face of the front wall of the drawer being shown at 23 with a packing of insulating material 24 between the faces 22 and 23. As shown this front wall of the drawer is of such a size as to normally close the front opening to the compartment 5 and a packing 25 is secured to the inner face of the front wall of the drawer for engaging the front face of the casing or housing 4 around the compartment opening, as shown more clearly in Figs. 3 and 5 of the drawing. A handle 26 is secured to the outer face of the front wall of the drawer so that the drawer may be slid into or from the compartment at will. At 27 I have illustrated latches adapted to engage the front wall of the drawer for holding the drawer within the compartment 5.

A plurality of removable containers are carried by the drawer and are supported by the angle bars or angle irons forming the bottom of the drawer. It will be understood that the upwardly extending portions of the inverted T-shaped bars will form spaces between the containers, as shown more particularly in Figs. 4 and 5 of the drawing. These containers include the body portions 28 and covers 29, the covers including a downwardly extending flange 30, received within the body portion as clearly shown. A vent opening 31 is formed in each of the covers.

From the above detailed description it is though that the construction of my improved form of food warmer or oven will be clearly understood. Very often when persons are going on a picnic or excursion it is desired to cook food for a lunch or other meal at home and carry the same in the automobile for later consumption. It can be appreciated that it will be desirable to keep the food warm and it is for this purpose that my improved form of warmer or oven is provided. The food will be placed into the removable containers and the covers 29 will be placed in position. The containers are then placed into the slidable drawer and supported by the angle bars, forming the bottom thereof, as shown more particularly in Figs. 3, 4 and 5 of the drawing. The drawer will then be slid into the compartment 5 with the packing 25 on the inner face of the front wall of the drawer engaging the outer face of the casing or housing 4, around the opening leading to the compartment. The latches 27 will then engage the front wall of the drawer and hold the drawer within the compartment 5. When the automobile is running the water of the cooling system will naturally become hot and will be circulated through the chamber 9 of the casing or housing 4 through the inlet pipe 10 and outlet pipe 11. This will maintain the temperature of the food in the removable containers within the drawer and any steam generated within the containers will pass through the vent openings 31 and be discharged through the vent 12 which leads to the interior of the compartment 5. When it is desired to consume the food, when the persons have reached their destination, the latches 27 may be disengaged from the front wall of the drawer and by engaging the handle 26 the drawer may be pulled outwardly from the compartments and access may be gained to the removable containers and the food removed for consumption. The inlet and outlet pipes 10 and 11 respectively, as previously stated, may be connected to the automobile cooling system at any desired point and in any desired manner.

Having fully described my invention what I claim as new and desire to secure by Letters Patent is:

In combination with the water cooling system of an automobile, a food warmer including an outer casing or housing having an open front compartment therein, a space being provided between the outer casing or housing and the walls of the compartment, a removable drawer normally positioned within the compartment of the casing or housing, said drawer including a front portion adapted to overlie the opening into the compartment and including a skeleton frame carried by the front portion, the skeleton frame including a bottom formed of angle irons, a plurality of individual readily removable food containers supported by the bottom angle irons with portions of certain of the angle irons projecting upwardly and extending between and spacing the individual removable food containers, and means for circulating the water from the cooling system through the space between the casing or housing and compartment.

HERMAN J. MAIHACK.